Nov. 20, 1962          H. W. STRAAT          3,064,529
MICROSCOPE HAVING ROTATABLE AND YIELDABLE LENS CASING
Filed April 25, 1960          2 Sheets-Sheet 1
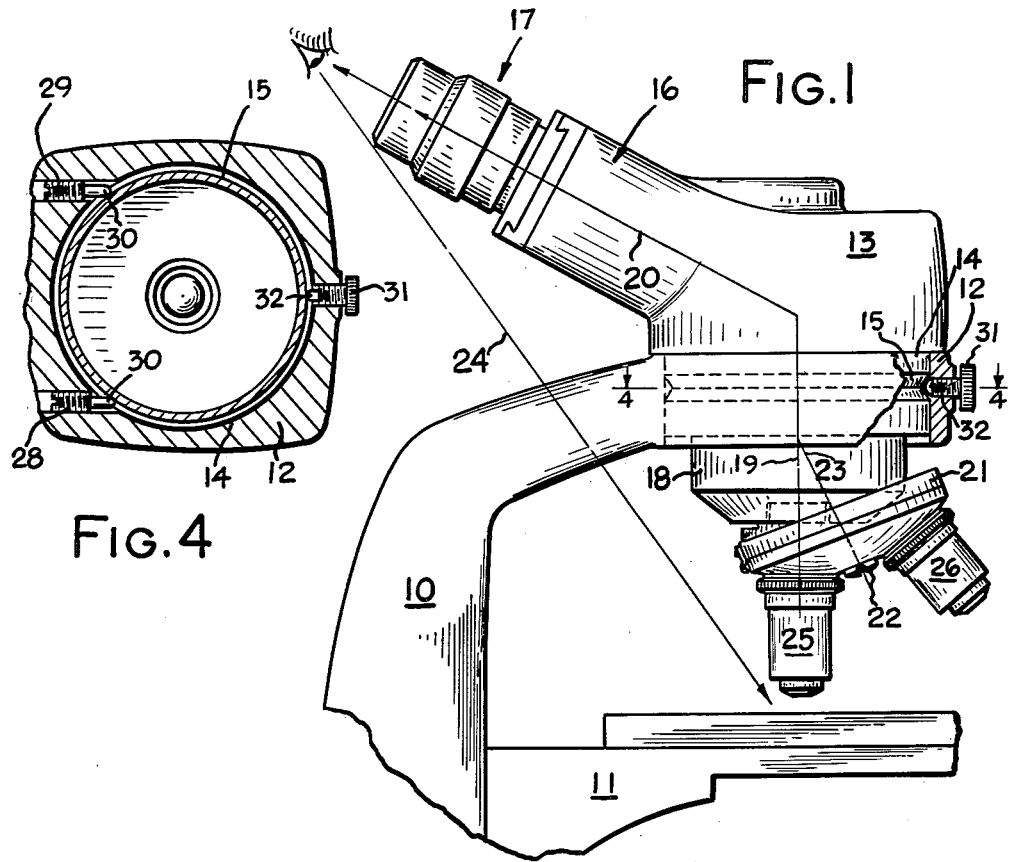
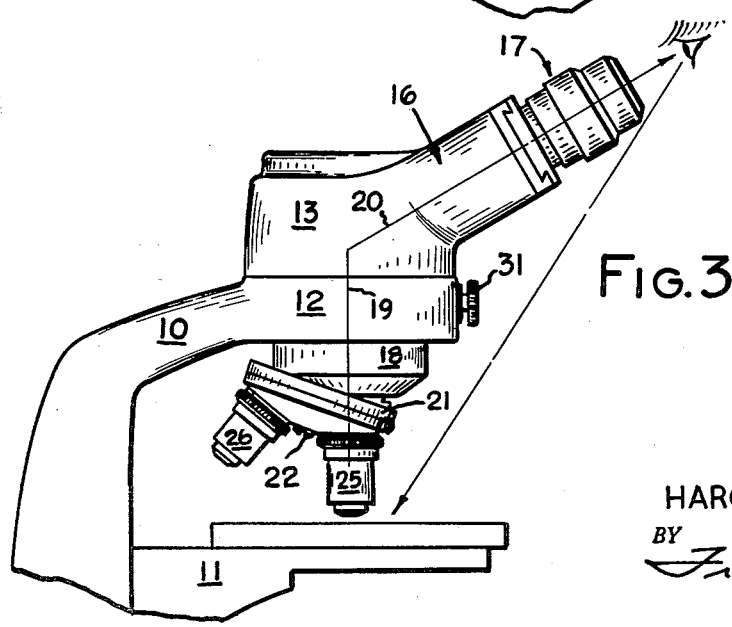
INVENTOR.
HAROLD W. STRAAT
BY
Frank C. Parker
ATTORNEY Nov. 20, 1962 H. W. STRAAT 3,064,529
MICROSCOPE HAVING ROTATABLE AND YIELDABLE LENS CASING
Filed April 25, 1960 2 Sheets-Sheet 2
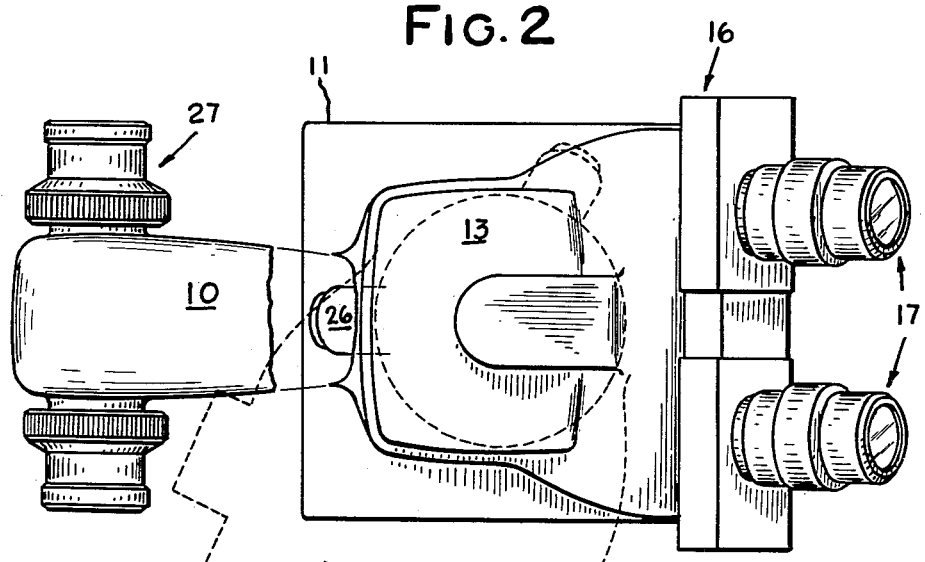
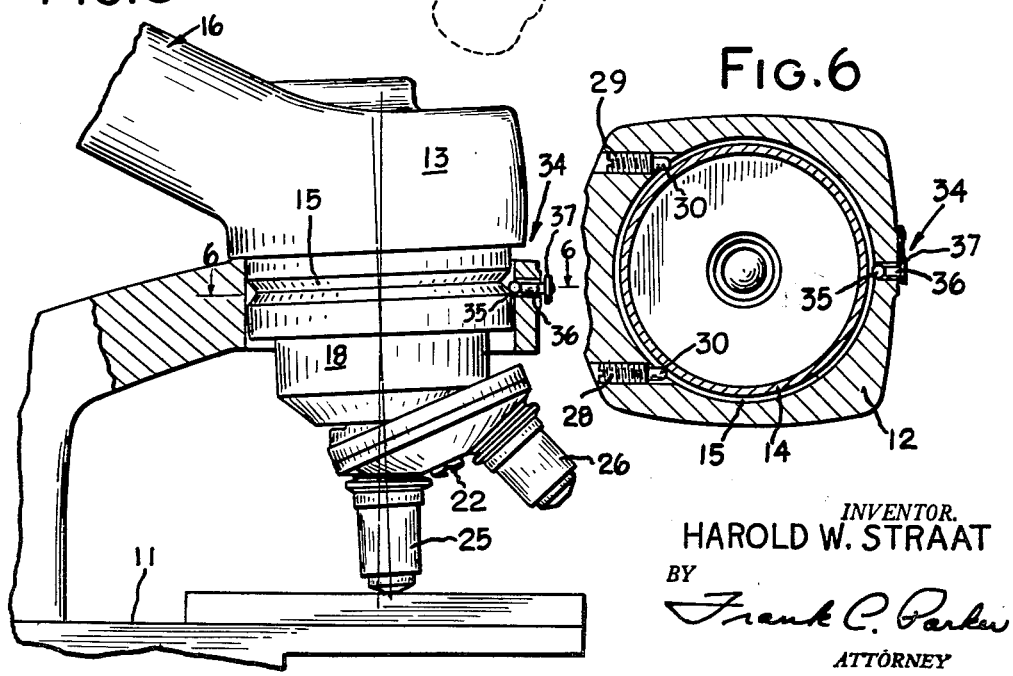
INVENTOR.
HAROLD W. STRAAT
BY
Frank C. Parker
ATTORNEY

United States Patent Office 3,064,529
Patented Nov. 20, 1962

3,064,529
MICROSCOPE HAVING ROTATABLE AND
YIELDABLE LENS CASING
Harold W. Straat, Irondequoit, N.Y., assignor to Bausch
& Lomb Incorporated, a corporation of New York
Filed Apr. 25, 1960, Ser. No. 24,390
1 Claim. (Cl. 88—39)

The present invention relates in general to microscopes and more particularly to microscopes of the type utilizing multiple objectives mounted upon a single rotatable turret.

The present invention is particularly suitable for that class of microscopes utilizing a support arm having a mounting ring within which a casing mechanism, including an objective support and an eyepiece support, is movably mounted in order to permit selectively positioning of the microscope eyepiece mechanism so as to facilitate observation of an object by different persons spaced around the microscope.

It is conventional practice in microscopes of the above-mentioned type to mount the eyepiece support mechanism so that it is rotatable with respect to the objective support mechanism so that as the eyepiece is moved around to different positions, different persons may conveniently view the object. With such microscopes which utilize turret mounted multiple objectives, in at least certain positions of the eyepiece, the inactive objectives interfere with the line of sight from the eyepiece to the specimen mounting stage immediately beneath the active objective.

The present invention has for its principal object the provision of a microscope wherein a movable casing mechanism having integral objective support means and eyepiece support means is movable as a unit to selected angular positions in such a manner that the inactive objectives are at all times disposed out of the line of sight from the eyepiece to the specimen mounting stage immediately beneath the active objective.

Further, more detailed objects of the present invention include the provision of set screw mechanism for accurately positioning the objective support and eyepiece support casing so that, irrespective of the angular disposition of the eyepiece, the object will remain within the field of view.

A modification of the present invention includes detent mechanism in place of at least one of the aforementioned set screw devices which serves as an anticrash mechanism in the event that one of the objectives is improperly moved into engagement with the specimen mounting stage. In this form of the invention the detent mechanism yields slightly, permitting the objective support casing to also yield and tend to prevent damage to the instrument.

A principal advantage of the present invention resides in the fact that the inactive objectives are at all times disposed out of the line of sight from the eyepiece to the specimen mounting stage, thereby enabling the observer to easily glance down at the mounting stage without actually moving his head in so doing.

The foregoing objects and advantages of the present invention will become more apparent from the following detailed description, when read in conjunction with the accompanying drawings wherein:

FIG. 1 is a side elevational view of a microscope constructed in accordance with the principles of the present invention;

FIG. 2 is a top plan view of the microscope disclosed in FIG. 1;

FIG. 3 is a side elevational view of the microscope shown in FIG. 1 but with the eyepiece support and objective support casing rotated approximately 180° and illustrating the fact that the inactive objectives are out of the line of sight from the eyepiece to the specimen mounting stage regardless of the position of the eyepiece support and objective support casing within the mounting ring;

FIG. 4 is a detailed sectional view taken substantially along the line 4—4 in FIG. 1 and looking in the direction of the arows;

FIG. 5 is a fragmentary side elevational view of a microscope embodying a slightly modified construction of the invention; and FIG. 6 is a sectional view taken substantially along the line 6—6 in FIG. 5 and looking in the direction of the arrows.

With reference now to the drawings, wherein like reference numerals in the different views have been used to identify identical parts, and referring first to the embodiment of the invention disclosed in FIGS. 1–4, the microscope includes a supporting arm 10 having a specimen mounting stage 11 movably mounted with respect thereto and including a mounting ring portion 12. The mounting ring portion 12 comprises a substantially annular cylindrical ring for receiving a microscope casing 13, the microscope casing 13 being formed with a complementary cylindrical portion 14 formed with an annular peripheral groove 15 therein.

The microscope casing 13 includes an eyepiece support mechanism 16 which mounts an eyepiece 17. In the present disclosure, the eyepiece 17 is shown as being a binocular eyepiece but it will be understood that this is not essential as the eyepiece could just as well be monocular insofar as the present invention is concerned. The microscope casing also includes a depending objective support mechanism 18, the axis 19 of which is disposed substantially vertically and at an obtuse angle to the axis 20 of the eyepiece support 16. An objective mounting turret 21 is rotatably mounted on the objective support 18 by means of a mounting bolt 22 and is rotatable about an axis 23 which forms an acute angle with the axis 19 of the objective support 18. As is clearly shown in the different views of the drawings, the mounting bolt 22 is disposed beyond the line of sight 24 from the eyepiece to the mounting stage 11 beneath the active objective 25 so that none of the inactive objectives 26 interferes with such line of sight.

The specimen mounting stage 11 is adjustable by means of coarse and fine adjusting mechanism 27 which need not be further described.

In order to accurately position the binocular casing 13 within the mounting ring 12, a plurality of set screw means are provided. To this end, a pair of set screws 28 and 29 are respectively received within threaded openings disposed approximately 120° from each other and are formed with leading ends 30 which project through the mounting ring 12 and into the annular peripheral groove 15. A third set screw 31 is also threaded into an opening in the mounting ring 12 and has a leading end 32 which projects into the groove 15. By adjusting the three screws 28, 29 and 31, the binocular casing 13 may be accurately aligned within the mounting ring 12. Thereafter, merely loosening the screw 31 permits freedom of rotation of the microscope casing 13 so as to facilitate moving the eyepiece 17 to any desired angular position within the mounting ring. With reference to FIG. 2, it will be apparent that the dotted position, represented by reference numeral 33, discloses one different angular position of the microscope casing whereas FIG. 3 represents the microscope with the eyepiece 17 and casing 13 rotated 180° from the position shown in FIG. 1. It will be apparent that in all of the views which designate different positions of the microscope casing, the inactive objectives 26 are at all times out of the line of sight 24 so that an observer may very easily shift his view from the image received through the microscope to the object itself disposed upon the specimen mounting stage 11 beneath the active objective 25.

With reference now to FIGS. 5 and 6, a slightly modified form of the invention will be described. The same reference numerals have been used in this view to identify parts which are identical with the same parts in the first embodiment of the invention. The one structural difference between the embodiment of the invention shown in FIGS. 5 and 6 and the first embodiment of the invention comprises the substitution of a detent mechanism 34 for the set screw 31. The detent mechanism 34 comprises a ball 35 adapted to ride within the groove 15 and a plunger 36 which is urged into the groove 15 by means of a spring 37. In this embodiment of the invention the microscope casing 13 may be rotated without releasing the set screw, the screws 28 and 29 being effective to provide two mounting pins cooperable with groove 15 and the detent mechanism 34 being effective to retain the microscope casing 13 resiliently against the leading ends of the screws 28 and 29.

The detent mechanism 34 provides an anti-crash feature for the microscope which yields when the specimen mounting stage 11 is moved upwardly until it engages the active objective 25. Under these conditions the detent mechanism 34 yields to permit slight tilting of the microscope casing 13 which tends to prevent breakage of any of the optical elements.

By the present invention there has been provided a simple and convenient structural arrangement for a microscope whereby the inactive objectives are at all times retained out of the line of sight from the eyepiece to the specimen mounting stage beneath the active objective. This is particularly important to an operator using the microscope as it enables him to momentarily shift his glance from the image formed by the microscope to the object itself disposed on the mounting stage without being confronted with an intervening member which would make it necessary for him to actually move his head in order to see the object. This desirable feature of the present invention functions during all angular positions of the microscope casing as distinguished from the conventional microscopes wherein the eyepiece support mechanism itself ordinarily rotates with reference to the objective support mechanism so that in certain angular positions of the eyepiece support mechanism the inactive objectives are in the line of sight from the eyepiece to the specimen mounting stage beneath the active objective.

It is contemplated that changes and modifications may be made in the present invention without departing from the spirit or scope thereof.

What is claimed is:

In a microscope including an adjustable specimen mounting stage and a support arm having a mounting ring, a casing for housing the microscope optical system, said casing including an integral objective support and an integral eyepiece support disposed at an obtuse angle to each other, an eyepiece mounted on said eyepiece support, said casing including means defining an annular groove received within said mounting ring, means carried by said mounting ring and including a plurality of threaded aligning pin members and detent means projecting into said annular groove for adjustably aligning said casing within said mounting ring and enabling rotation thereof as a unit to any selected angular position within the mounting ring, said aligning pin members and said detent means disposed on opposite sides of said mounting ring and forming the sole connection between said mounting ring and said casing, and a turret including a plurality of objectives for selectively positioning the same in active position while the remainder are disposed in inactive position, said turret being rotatable upon said objective support about an axis displaced generally beyond a line of sight extending from the eyepiece to the stage beneath the active objective, whereby the casing may be rotated to any selected angular position within the mounting ring without obstruction from an inactive objective to the line of sight from the eyepiece to the stage beneath the active objective and said detent means being yieldable in the event of crash between the stage and the active objective to thereby prevent damage to the active objective.

References Cited in the file of this patent

UNITED STATES PATENTS

| | | |
|---|---|---|
| 1,197,390 | Ott | Sept. 5, 1916 |
| 2,214,367 | Gallasch | Sept. 10, 1940 |
| 2,439,526 | Ott | Apr. 13, 1948 |
| 2,696,755 | Frischmann | Dec. 14, 1954 |